United States Patent [19]

Richards

[11] 3,844,397

[45] Oct. 29, 1974

[54] AUTOMATIC UNDERLINING IN AN AUTOMATED TYPEWRITER SYSTEM

[75] Inventor: Edward M. Richards, Commack, N.Y.

[73] Assignee: Redactron Corporation, Hauppauge, N.Y.

[22] Filed: May 21, 1973

[21] Appl. No.: 362,382

Related U.S. Application Data

[63] Continuation of Ser. No. 201,306, Nov. 23, 1971, abandoned.

[52] U.S. Cl. .................................................. 197/19
[51] Int. Cl. ................................................ B41j 5/30
[58] Field of Search ........... 197/113, 19, 20, 91, 18, 197/16; 340/172.5

[56] References Cited

UNITED STATES PATENTS

| | | | |
|---|---|---|---|
| 3,036,686 | 5/1962 | Bacher | 197/113 |
| 3,294,956 | 12/1966 | Jenkins et al. | 197/19 X |
| 3,311,211 | 3/1967 | Schaefer | 197/113 UX |
| 3,509,982 | 5/1970 | Palmer | 197/113 |
| 3,630,336 | 12/1971 | Johnson et al. | 197/19 X |

*Primary Examiner*—Robert E. Pulfrey
*Assistant Examiner*—R. T. Rader
*Attorney, Agent, or Firm*—Hane, Baxley & Spiecens

[57] ABSTRACT

In an automated typewriter system having a memory for sequentially storing bytes generated by operator keystrokes during an input mode an operator generates by a keystroke a start underline control byte which is stored in the memory and thereafter keystrokes in the word (group of symbols) to be underlined. The bytes of this word are stored in sequence following the start underline control byte. The operator then generates by another keystroke an end underline control byte which is stored in the memory. This end underline control byte initiates the automatic sequential reading of the bytes of the memory in the inverse order of entry. After each byte is read the typewriter is automatically backspaced one position. The reading and backspacing continue until the start underline control byte is read. Now the bytes are sequentially read automatically in the original order of entry. After each byte is read one underline symbol is automatically printed. The reading and underline continue until the end underline control byte is read.

5 Claims, 2 Drawing Figures

FIG. 2 INPUT CONTROLLER 16
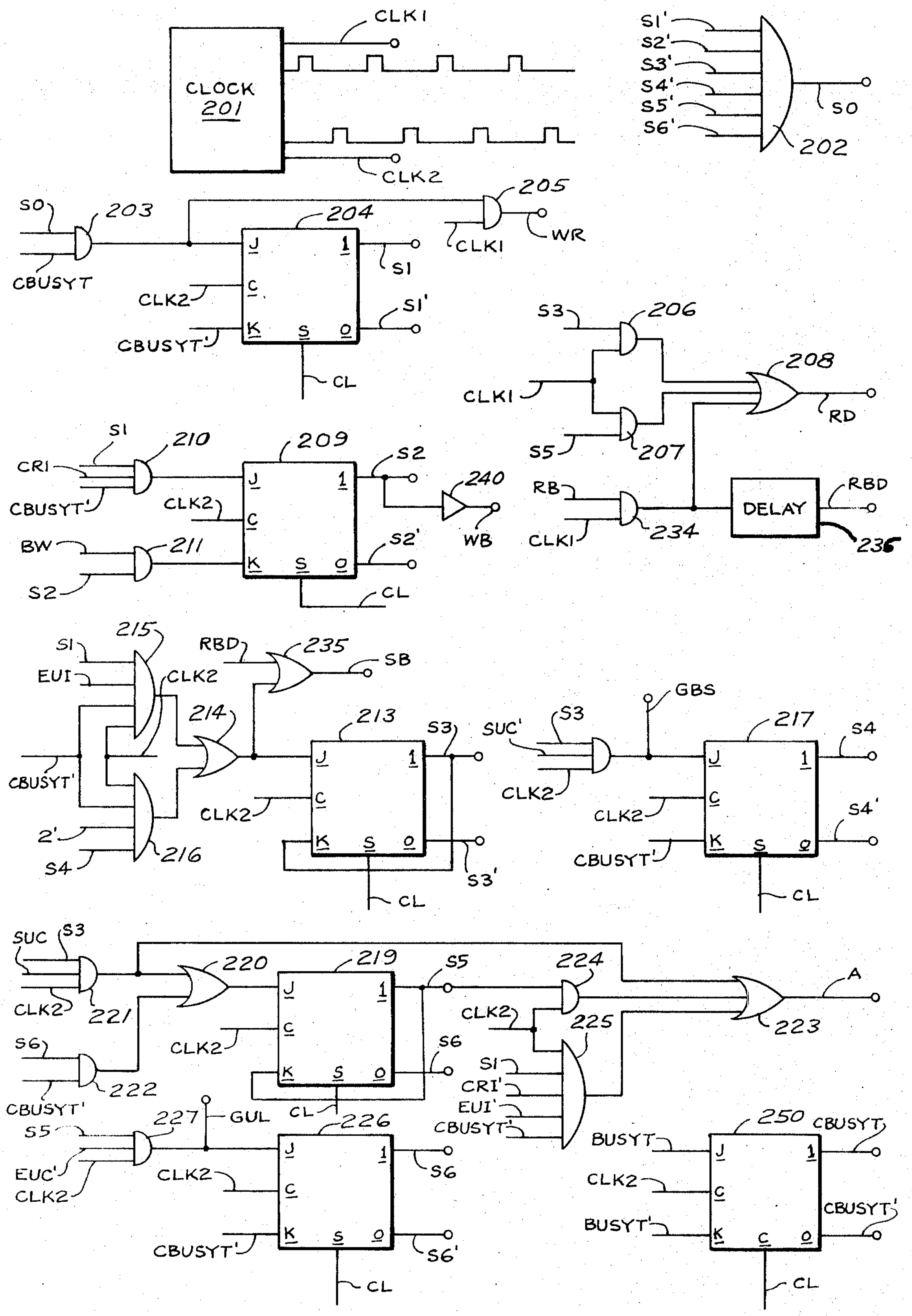

AUTOMATIC UNDERLINING IN AN AUTOMATED TYPEWRITER SYSTEM

This is a continuation of application Ser. No. 201,306, filed Nov. 23, 1971, now abandoned.

This invention pertains to automated typewriters and more particularly to underlining processes for such typewriters.

Automated typewriters generally comprise a typewriter that when printing hard copy by operator keystrokes also generates signals representing the keys that were stroked. and will automatically print graphic symbols or perform other operations such as backspacing, spacing, etc. in response to received signals representing the keys which would normally perform these functions.

Generally, on a first draft an operator types the hard copy while key-representation signals in the form of coded combinations of electrical signals (bytes) are transduced and sequentially stored in a storage medium, such as paper tapes, magnetic tapes or magnetic cards. Later, to generate a second draft, the operator need only activate the storage medium to sequentially transmit its contents to the typewriter which in response thereto automatically types the new copy.

Because of the serial loading of the storage medium, problems arise when a word (groups of symbols) of the copy must be underlined. Normally, underlining is performed by an operator by typing the word to be underlined returning the carriage to the beginning of the word and then typing in the underline symbols. In effect, for each underlined word the operator must perform at least two and most likely three times the number of keystrokes she would perform for the equivalent non-underlined word. When the word extends over many characters, such a procedure can be time consuming.

It is, therefore, a general object of the invention to minimize the operator's time to underline words when typing into an automated typewriter.

Other objects, features and advantages of the invention will be apparent from the following detailed description while the invention is defined by the appended claims.

The description makes reference to an automated typewriter system shown in the drawing, wherein:

FIG. 2 is a logic diagram of the input controller of the system of FIG. 1.

Figure 1:
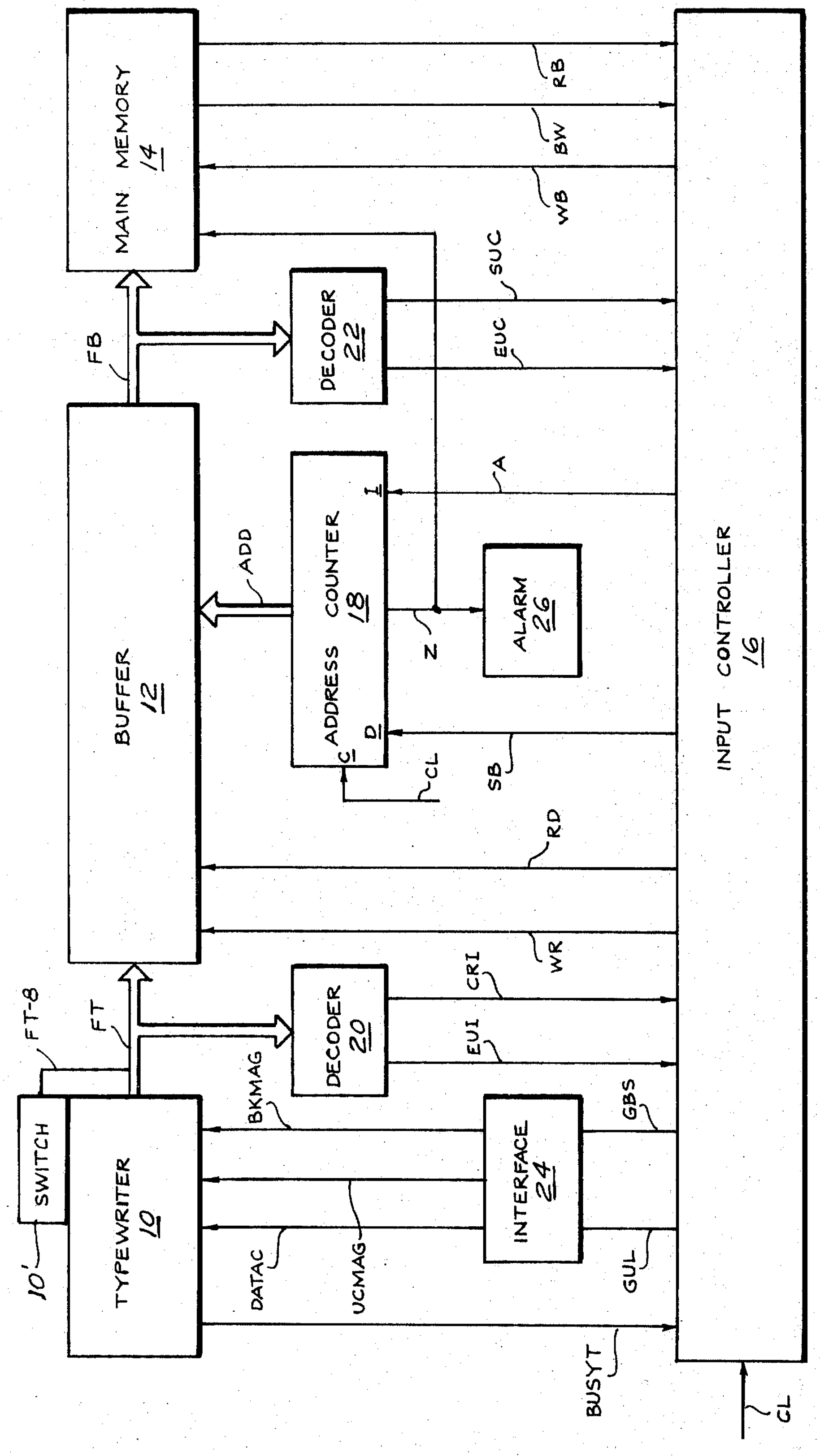
FIG. 1 is a block diagram of the relevant portions of such a system.

In general, the automatic underlining process proceeds according to the following sequence. An operator, via a typewriter, types symbols onto a hard copy. As each symbol is typed its coded signal representation (a byte) is sequentially stored in an addressed memory. When a word (group of symbols) is to be underlined, the operator causes the generation of a start underline control byte which is also stored in the memory and then types the symbols of the word to be underlined. Then, the operator causes the generation of an end underline control byte which is also stored in the memory. When the end underline control byte is sensed upon its presentation to the memory for storage, the bytes stored in the memory are sequentially read in the inverse order. As each byte is read the typewriter is automatically backspaced one print position. The reading and backspacing continue until the start underline control byte is read. Then the bytes in the memory are sequentially read in the original order. As each byte is read an underline symbol is automatically typed onto the hard copy. The automatic underlining and byte reading continues in this manner until the end underline control byte is read. Thereafter, the operator proceeds with normal typing.

The invention will be described, by way of example, in conjunction with an automated typewriter system. Since the invention is concerned with the input mode of such a system, i.e., the initial typing of hard copy by an operator and the storage of the bytes, representing the keystrokes and control operations for subsequent playback, only the operation of those portions of the system concerned with the input mode will be shown and described to simplify the disclosure.

The system as shown in FIG. 1 centers around the flow of keystroke bytes from typewriter 10, via a buffer 12 whose storage cells are addressed by address counter 18, to a main memory 14 under control of an input controller 16 which receives operation defining signals from decoders 20 and 22.

The typewriter 10 can take many forms, however, for definiteness the typewriter will be assumed to be an IBM SELECTRIC Input/Output Writer. In such a typewriter, whenever an operator strokes a key, the typewriter transmits a coded combination of seven signals, in parallel, (a graphic byte) representing the keystroke. However, in an editing typewriter system it is necessary to embed in the stream of graphic bytes control bytes which are used primarily during the output mode to control the flow of graphic bytes and the formating of the data. To permit the generation of control bytes, all bytes including graphic bytes are expanded to a coded combination of eight signals. The presence or absence of the eighth signal is controlled by switch 10'. As long as graphic bytes are to be transmitted, the operator does not depress switch 10' when stroking the keys and the eighth signal is absent. When a control byte is to be transmitted, the switch 10' is depressed along with the stroking of a key so that the eighth signal is present along with the coded combination of signals generated by the keystroke. The typewriter is so modified that when switch 10' is depressed, the carrier indexes one space to the right but does not print and is then backspaced to eliminate the unwanted index step to the right. Thus, it should be noted that each key is usually associated with a graphic symbol, i.e., a numeric, alphabetic character, etc., and generates a graphic byte but when switch 10' is depressed a key can represent a control byte. In the process to be described there will be used only two control bytes, one associated with start underline and the other with end underline. For definiteness it will be assumed that the start underline control byte can be generated by depressing numeric key 2 on the keyboard of typewriter 10 when switch 10' is depressed, and the end underline control byte can be generated by depressing numeric key 3 on the keyboard of typewriter 10 when switch 10' is depressed. In any event, the bytes are transmitted over a cable FT comprising eight lines FT1 to FT8.

In addition, the typewriter 10 is capable of automatic outputting, i.e., it can type under control of received signals.

For the present invention, only two automatic operations will be described, backspacing and underlining. The typewriter does have a backspace input connected to a backspace operational magnet such that whenever it receives a BKMAG signal at the backspace input the carrier backspaces one unit. In addition, the typewriter does have a plurality of selection magnet inputs to select a graphic symbol to be printed and an index magnet input which causes the selected graphic to be printed upon receipt of signals at these inputs. Now, it just so happens that with the IBM SELECTRIC the underline symbol is selected by not energizing any of the selection magnets and by energizing the upper case position magnet. Therefore, to print an underline symbol the index magnet is energized by a DATAC signal and the upper case position magnet is energized by a UCMAG signal.

Furthermore, whenever the typewriter prints a character, performs a backspace, performs a carrier return, etc., whether in response to an operator keystroke or to received signals, it transmits a BUSYT signal.

The buffer 12 can be a core storage system having an input register, an output register and a plurality of, say 128, addressable storage registers, each register being capable of storing a byte. Under control of a WR pulse signal the byte in the input register is transferred to the storage register whose address is indicated by the coded combination of signals on the lines of cable ADD. Under control of an RD signal the contents of the storage register whose address is indicated by the coded combination of signals on the line of cable ADD is non-destructively read into the output register. The input register is connected to the lines of cable FT and the output register is connected to the lines of cable FB.

The main memory 14 can be a serial magnetic medium storage system such as a magnetic tape or cards which can include intermediate buffering and serializing apparatus which accepts the contents of buffer 12 via lines FB under control of a WB signal and indicates the contents of the buffer have been stored by generating a BW signal. In particular, to read the bytes from buffer 12 the memory includes a freerunning pulse generator which generates RB pulses to transfer bytes. The pulse generator is turned on by the receipt of the WB signal and off by the receipt of a Z signal.

The address counter 18 can be an up-down counter; which is incremented by one each time a pulse signal is received at input I connected to line A; which is decremented by one each time a pulse signal is received at input D connected to line SB; and which is cleared to an initial start value each time a pulse signal is received at input C connected to line CL. A representation of the accumulated count is generated on the line ADD. When the accumulated count is zero a signal is transmitted on line Z to alarm 26 which can give a visual and/or audible alarm. Counter 18 can be one of the UP/DOWN COUNTERS shown on Pages 81 to 84 of Digital Logic Handbook 1971, published by Digital Equipment Corporation of Maynard, Mass.

Decoder 20 can be a conventional decoder which receives the coded combination of signals on the lines of cable FT to generate a signal on line EUI when detecting an end underline control byte, and to generate a signal on line CRI when detecting a carrier return operational byte. Similarly, decoded 22 has its inputs connected to the lines of cable FB, and generates a signal on line EUC when detecting an end underline control byte and generates a signal on line SUC when detecting a start underline control byte.

Interface 24 contains level shifting and amplifying circuits which generate signals on the lines DATAC and UCMAG in response to a signal on line GUL, and a signal on line BKMAG in response to a signal on line GBS.

Input controller 16, hereinafter more fully described controls information flow during the automatic underline process in response to signals on line BUSYT, EUI CRI, EUC, SUC and BW by generating signals on lines GUL, GBS, CL, SB, A and WB.

Before describing the operation of the system several conventions will be noted. While the lines and inputs and outputs connected thereto in FIG. 1 are shown carrying one logic condition, in many cases the line is a pair with the other line carrying the inverse of that logic condition. Thus, line EUC is actually a pair of lines EUC and EUC'. Furthermore, with respect to FIG. 2 all inputs are shown connected to the actual of the pair. However, for simplicity, in some cases the output connected to the inverse line of the pair is not shown. Nevertheless, it should be apparent that any inverse function can be obtained by passing the signal through an inverter.

In addition, a signal name will be used as a common denominator. Thus, for example, the GBS signal is carried on line GBS which is connected to the GBS output of AND-gate 218 and the GBS input of interface 24. Moreover, positive logic will be used. Therefore, when a signal such as Z is present, it is "up" or "high" while its inverse Z' is absent, "down" or "low;" and when a signal such as Z is absent, it is "down" or "low" and its inverse Z' present, "up" or "high."

The operation of an input mode process will now be described for the system as shown in FIG. 1, assuming that an initial clear signal CL was generated by means not shown, to set all flip-flops and counters to an initial state.

The operator starts typing in a normal manner. In particular, assume a graphic symbol key is stroked. The associated graphic symbol byte is fed via the lines of cable FT to the input register of buffer 12 and the graphic symbol is printed. During the printing the BUSYT signal is transmitted to input controller 16 resulting in the generation of the WR pulse signal followed a given time thereafter by an A pulse signal. The WR pulse signal fed from controller 16 to buffer 12 causes the contents of the input register therein to be transferred to the storage register therein whose address is represented by the signals on the lines of cable ADD from address counter 18. The A pulse signal received by the I input of address counter 18 causes the count therein to be unit incremented. Thus, the graphic symbol is printed and the graphic symbol byte is stored. The same sequence would occur for any operational bytes such as tab, backspace, space, etc., but not for carrier return. A carrier return operation generally implies a line has been typed and a new line should be typed. In any event, the carrier return operation is used to control the block transfer of the contents of buffer 12 to main memory 14. Thus, when the carrier return key is stroked by the operator, this operational control byte is fed via the lines of cable FT to the input register of buffer 12 and is stored in the same manner as a graphic symbol byte. However, in addition decoded 20 senses this carrier return control byte on cable FT and transmits a CRI signal to controller 16. At the termination of the BUSYT signal controller 16 transmits a WB signal to main memory 14 which starts extracting and storing bytes from buffer 12. For each byte, main memory 14 transmits an RB pulse signal to controller 16 which in response thereto generates an RD pulse signal followed a given time thereafter by an SB pulse signal. The RD pulse signal received by buffer 12 transmits the contents of the storage register whose address is represented by the signals on lines ADD from address counter 18 to the output register of buffer 12 and via lines FB to main memory 14. The SB pulse signal received at the input D of address counter 18 causes a unit decrementing of the accumulated count. This byte-by-byte transfer continues until counter 18 has counted down to zero when it generates a Z signal which when received by memory 14 stops the transfer and transmits a BW signal to controller 16 to return the controller to a rest state. The Z signal triggers alarm 26 to alert the operator at this time that a new line can be typed.

Now, assume that in the course of typing the new line a word must be underlined. Just before the first character of the word, the operator depresses switch 10′ and at the same time strokes the key for numeral 2 and then releases both keys. This control byte is stored in the usual manner. Thereafter, the operator keystrokes in the characters of the word to be underlined. After the last character of the word, the operator again depresses switch 10′ and strokes the numeral key 3 to generate an end underline control byte which is processed and stored in the same manner as the start underline control byte. However, in addition thereto the end underline control byte is sensed by decoder 20 to generate an EUI signal which is fed to input controller 16. In response thereto controller 16 first transmits an SB pulse signal to unit decrement address counter 18, and then transmits an RD pulse to buffer 12 to transmit the contents of the now addressed storage register to lines FB as described above. However, main memory 14 did not receive a WB signal so it ignores the bytes on lines FB. Controller 16 then generates a GBS signal which is fed via interface 24 and line BKMAG to typewriter 10. In response thereto, typewriter 10 performs a unit backspace operation and generates a BUSYT signal. At the end of the BUSYT signal, controller 16 generates another SB pulse signal which is followed by an RD pulse signal and the byte of the next character (the second from last) of the word is on the lines of cable FB. Controller 16 then generates another GBS signal to initiate another backspace and BUSYT signal. Sequences of an RD pulse signal, a GBS signal, a BUSYT signal and SB pulse occur until the start underline control byte is present on the lines of cable FB in response to an RD pulse signal. At this time the typewriter has backspaced to the first character of the word to be underlined. This control byte is sensed by decoder 22 which transmits an SUC signal to controller 16. In response thereto controller 16 instead of generating the GBS signal of the sequence transmits an A pulse signal followed by an RD pulse signal to buffer 12 which presents the byte of the first character of the word to be underlined to the lines of cable FB. Note the memory 14 still ignores bytes. Then controller 16 generates a GUL signal which is fed via interface 24 and lines UCMAG and BKMAG to typewriter 10 which prints an underline symbol under the first character of the word and generates the usual BUSYT signal. In response thereto, controller 16 generates a sequence of an RD pulse signal, and an A pulse signal and a GUL signal, and typewriter 10 prints an underline symbol and generates a BUSYT signal. These sequences continue until an RD pulse signal causes buffer 12 to present an end underline control byte to the lines of cable FB. Decoder 22 senses this byte and transmits an EUC signal to controller 16 to switch the controller back to its rest state so that the operator can now continue with the manual keystroking. However, immediately following the last RD pulse signal one final A pulse signal is generated so that address counter 18 holds the next available address in the sequence following the address of the end underline control byte.

Now, if during the backspacing routine to find the start underline control byte this byte is never sensed by decoder 22, backspacing and address counter 18 decrementing continues until the accumulated count reaches zero. At the time counter 18 generates a Z signal which triggers alarm 26. This time the alarm tells the operator that there has been some kind of error and appropriate corrective action should be taken.

FIG. 2 shows input controller 16 which during the operation is in one of seven states characterized by signals S0, S1, S2, S3, S4, S5 and S6. State switching is timed by clock pulses CLK2 from a clock 201 which also generates another phase of clock pulses CLK1 which controls the timing of read RD and write WR pulse signals to buffer 12. As can be seen from the waveforms adjacent the CLK1 and CLK2 outputs of clock 201, each CLK1 pulse signal is followed a given time later by a CLK2 pulse signal. This relationship should be remembered in what follows.

State zero is the rest or initial state of the controller 16 and is indicated by a SO signal which is generated by AND-gate 202 whose inputs are connected to the S1′, S2′, S3′, S4′, S5′ and S6′ signal lines.

Associated with each of the other states is a J-K flip-flop such as flip-flop 204 associated with state 1. Flip-flop 204 and all other flip-flops are initially cleared by a CL signal (from a source not shown) received at its clear input S, and is clocked to change state by the trailing edge of a CLK2 pulse signal received at clock input C.

Flip-flop 204 generates the S1 signal of state one which is associated with the writing of bytes from typewriter 10 into buffer 12. The J input of flip-flop 204 is connected to the output of AND-gate 203 whose inputs receive the CBUSYT signal (a synchronized BUSYT signal) and the SO signal, and the K input receives the CBUSYT′ signal. Thus, state one can only occur when the operator keystrokes. In addition, the output of AND-gate 203 is connected to one input of AND-gate 205 whose other input is connected to line CLK1 and whose output is connected to line WR. The sequence for state one is then as follows, the first CLK1 pulse signal after the start of the CBUSYT signal causes the generation of a WR pulse and the byte is written into the buffer 12. The first CLK2 pulse signal after this CLK1 pulse signal sets flip-flop 204 causing the generation of the S1 signal. The flip-flop 204 remains set until the first CLK2 clock pulse signal after the termination of the CBUSYT signal, i.e., CBUSTYT′ occurs.

Flip-flop 209 generates the S2 signal of state two which is associated with the transfer of the contents of buffer 12 to main memory 14. The 1 output of flip-flop 209 is connected via a one-shot pulser 240 to line WB. The J input of flip-flop 209 is connected to the output of AND-gate 210 whose inputs receive the S1, CRI and CBUSYT' signals, and whose K input is connected to the output of AND-gate 211 whose inputs receive the BW and S2 signals. Thus, when the controller 16 is in state one and a carrier return is keystroked in by the operator, the flip-flop sets and generates the S2 and WB signals. The WB pulse signal energizes main memory 14 to start the transfer. At the end of the transfer indicated by the BW signal from memory 14 the flip-flop 209 is reset.

Flip-flop 213 generates the S3 signal of state three which is associated with the reading of the bytes in buffer 12 while backspacing to the start of the word to be underlined. The J input of flip-flop 213 is connected to the output of OR-circuit 214 whose inputs are connected to he output of AND-gate 215 and the output of AND-gate 216. The output of OR-circuit 214 is also connected to an input of OR-circuit 235 whose other input is to the RBD signal line and whose output is connected to line SB. The inputs of AND-gate 215 receive the S1, EUI, CBUSYT' and CLK2 signals. The inputs of AND-gate 216 receive the CLK2, CBSUYT', Z' and S4 signals. The K input of flip-flop 213 is connected to line S3.

Flip-flop 217 generates the S4 signal of state four which is associated with the actual automatic backspacing. The J input of flip-flop 217 is connected to line GBS which is connected to the output of AND-gate 218 whose inputs receive the signals S3, SUC', and CLK2, while the K input receives the CBUSYT' signal. The operation of the flip-flops 213 and 217 is as follows. When an end underline control byte is detected, decoder 20 transmits the EUI signal to AND-gate 215 during state one causing the generation of an SB pulse which decrements the address counter 18 (FIG. 1) and sets flip-flop 213 causing the generation of the S3 signal. The S3 signal as will hereinafter become apparent, causes the generation of an RD pulse signal at the occurrence of the first CLK1 pulse signal thereafter causing the reading of the then addressed byte in buffer 12. If this byte is not a start underline control byte, the next occurring CLK2 pulse signal causes the generation of a GBS signal, the setting of flip-flop 217 and the resetting of flip-flop 213. The typewriter backspaces the generates the BUSYT signal. At the end of the BUSYT signal the CBUSYT' signal goes high. At the next occurring CLK2 signal another SB pulse signal is generated and flip-flop 213 is again set (provided counter 18 is not back to zero) and, in any event, flip-flop 217 resets. The setting of flip-flop 213 will again cause the generation of the GBS and S4 signals. The loop is broken when the start underline control byte is read by decoder 22 which causes line SUC' to go low blocking AND-gate 218. The loop can also be broken when counter 18 reaches address zero. At that time the signal on line Z' is low blocking AND-gate 216.

Flip-flop 219 generates the S5 signal of state five associating with the reading of bytes from buffer 12 during the underlying operation. The J input of flip-flop 219 is connected to the output of OR-circuit 220 whose inputs are connected to the output of AND-circuit 221 and the output of AND-circuit 222. The inputs of AND-circuit 221 receive the S3, SUC and CLK2 signals. The inputs of AND-circuit 222 receive the S6 and CBUSYT' signals. The K input is connected to line S5.

Flip-flop 226 generates the S6 signal of state six which is associated with printing the underline symbols. The J input of flip-flop 226 is connected to line GUL which is connected to the output of AND-gate 227 whose inputs receive the S5, EUC' and CLK2 signals, while the K input receives the CBUSYT' signal.

The operation of flip-flops 219 and 226 is as follows. During state three when he start underline control byte is detected by decoder 22, the SUC signal gates a CLK2 pulse signal through AND-gate 221 to become an A pulse signal to increment counter 18 as will hereinafter be described and also sets flip-flop 219. The first CLK1 pulse signal during the presence of the S5 signal causes the generation of an RD pulse signal hereinafter described to cause the reading of the then addressed byte by buffer 12, The CLK2 pulse signal which follows this CLK1 pulse signal causes the generation of another A pulse signal and another counter incrementing hereinafter described, the generation of a GUL pulse signal and the setting of flip-flop 226, provided the just read byte is not an end underline control byte, and the resetting of flip-flop 219. The underline is printed in response to the GUL pulse signal. At the end of the CBUSYT signal associated with the underline printing, the coincidence of the presence of the S6 signal and the CBUSYT' signal at AND-gate 222 again sets flip-flop 219 while the presence of the CBUSYT' resets flip-flop 226. The S5 signal causes the generation of another RD pulse signal followed by the generation of A pulse signal, and provided an end underline control byte is not read, another GUL pulse signal and the setting of flip-flop 226. The cycle repeats until the end underline control byte is detected by decoder 22 which then generates the EUC' signal which blocks AND-gate 227.

The read pulses on line RD are transmitted from the output of OR-circuit 208 whose inputs are connected to the outputs of AND-gates 206, 207 and 234. The inputs of AND-gate 206 receive the S3 and CLK1 signals to generate buffer read pulses during the backspacing and search for the start underline control byte. The inputs of AND-gate 207 receive the S5 and CLK1 signals to generate buffer read pulses during the underline printing and search for end underline control byte routine. The AND-gate 234 receives the RB and CLK1 signals to generate buffer read pulses during the block transfer from buffer 12 to memory 14. Note the pulse signals from AND-circuit 234 are delayed by delay device 236 to become RBD pulses fed to OR-gate 235 which in turn, become address counter decrementing pulses during the block transfer.

The address counter increment pulses on line A are transmitted by the output of OR-circuit 223 whose inputs are connected to the output of AND-gate 221, the output of AND-gate 224 and the output of AND-gate 225. AND-gate 221 receives the S3, SUC, and CLK2 signals to provide the initial unit increment when the start underline control byte is detected. AND-gate 224 receives the S5 and CLK2 signals to provide the unit incrementing associated with each underline symbol printing. And-gate 225 receives the CLK2, S1, CRI', EUI' and CBUSYT' signals to provide normal unit incrementing as buffer 12 is loaded with bytes from typewriter 10.

Flip-flop 250 which generates the CBUSYT signal from its 1 output and the CBUSYT' signal from its 0 output has its input J connected to line BUSYT and its K input connected to line BUSYT'.

Although the terminology word was used with respect to underlining, it should be realized the word was defined as a group of symbols. Such a group does include many words, or even lines or paragraphs. Furthermore, while the routine is directed to underlining, it should be realized that each underlined character is a composite symbol, i.e., the character symbol plus the underline symbol, hence, the routine can be used for generating strings of other composite symbols, such as strings of primed characters or strings of slashed characters. Therefore, the terminology "underline" is meant to encompass symbols such as primes, slashes and the like in strings of composite symbols wherein one portion of each symbol is variable and the other portion is fixed.

What is claimed is:

1. For use with a typewriter which generates a particular coded combination of signals for each key which is stroked to perform a printing or other operation and which can perform said operations upon receipt of said particular coded combinations of signals, the method of automatically underlining a typed word comprising the steps generating a first given coded combination of signals representing a start underline control byte, storing said start underline control byte, sequentially stroking the keys of the typewriter associated with the word to be underlined, sequentially storing the coded combinations of signals generated by the keystrokings, generating a second given coded combination of signals representing an end underline control byte, storing said end underline control byte, after the storage of said second given coded combinations of signals, generating, in response to the stored coded combination of signals, signals for causing said typewriter to backspace one position for each of the stored coded combinations of signals bracketed between said first and second given coded combinations of signals, generating an alarm whenever the number of signals for causing backspacing exceeds a number related to the number of keystrokes performed between the generation of the first and second given coded combinations of signals, and, if no alarm is generated, then generating, in response to the stored coded combinations of signals, signals for causing said typewriter to print one underline symbol for each of the stored coded combinations of signals bracketed between said first and second given coded combinations of signals.

2. The method of claim 1 wherein the step of generating signals for causing said typewriter to backspace comprises sequentially reading, in the order opposite the order of storing, said sequentially stored coded combinations of signals generated by the keystroking followed by the reading of said stored first given coded combination of signals and generating a signal for causing said typewriter to backspace one position for each of the read coded combinations of signals until said first given coded combination of signals is read.

3. The method of claim 2 wherein the step of generating signals for causing said typewriter to print underline symbols comprises, after said first given coded combination of signals is read, sequentially reading in the order of the storing said sequentially stored coded combinations of signals generated by the keystroking followed by the reading of said second given coded combination of signals and generating a signal for causing said typewriter to print an underline symbol for each of the reread coded combinations of signals until said second given coded combination of signals is read.

4. The method of claim 1 wherein said first and second coded combinations of signals are generated by at least stroking different keys of the typewriter.

5. For use with a typewriter which generates a particular coded combination of signals for each key which is stroked to perform a printing or other operation and which can perform said operations upon receipt of said particular coded combinations of signals, the method of automatically underlining a typed block of characters including at least one space between two characters within the block comprising the steps generating a first given coded combination of signals uniquely representing a start underline control byte, storing said start underline control byte, sequentially stroking the keys of the typewriter associated with the block of characters to be underlined, sequentially storing the coded combinations of signals generated by the keystrokings including a space keystroke, generating a second given coded combination of signals representing an end underline control byte, storing said end underline control byte, after the storage of said second given combinations of signals, generating, in response to the stored coded combination of signals, signals for causing said typewriter to backspace one position for each of the stored coded combinations of signals bracketed between said first and second given coded combinations of signals, generating an alarm whenever the number of signals for causing backspacing exceeds a number related to the number of keystrokes performed between the generation of the first and second given coded combinations of signals, and then if no alarm is generated, generating, in response to the stored coded combinations of signals, signals for causing said typewriter to print one underline symbol for each of the stored coded combinations of signals bracketed between said first and second given coded combinations of signals.

* * * * *